US011737608B2

(12) United States Patent
Charles et al.

(10) Patent No.: US 11,737,608 B2
(45) Date of Patent: *Aug. 29, 2023

(54) CUTTING BOARD WITH NESTED CONTAINERS

(71) Applicant: TidyBoard LLC, San Francisco, CA (US)

(72) Inventors: Matthew Charles, San Francisco, CA (US); Mark Van Velzen, Lafayette, CA (US); William Charles, Reno, NV (US)

(73) Assignee: TidyBoard LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,124

(22) Filed: Jan. 4, 2023

(65) Prior Publication Data
US 2023/0148223 A1    May 11, 2023

Related U.S. Application Data

(63) Continuation of application No. 16/885,664, filed on May 28, 2020, now Pat. No. 11,571,091.

(60) Provisional application No. 62/853,394, filed on May 28, 2019.

(51) Int. Cl.
| | | |
|---|---|---|
| *B23Q 1/00* | (2006.01) | |
| *A47J 47/00* | (2006.01) | |
| *A47J 47/14* | (2006.01) | |
| *A47J 47/16* | (2006.01) | |

(52) U.S. Cl.
CPC ............. *A47J 47/005* (2013.01); *A47J 47/14* (2013.01); *A47J 47/16* (2013.01)

(58) Field of Classification Search
CPC .......... A47J 47/005; A47J 47/16; A47J 47/14
See application file for complete search history.

(56) References Cited

U.S. PATENT DOCUMENTS

| | | | |
|---|---|---|---|
| 4,435,434 | A | 3/1984 | Caporaso |
| 6,460,841 | B1 | 10/2002 | Durr |
| 7,213,806 | B2 | 5/2007 | Mitchell |
| 7,252,255 | B2 | 8/2007 | Cornfield |
| D6,059,087 | | 12/2009 | Pearl et al. |
| 8,251,357 | B2 | 8/2012 | Young |
| 9,049,963 | B2 | 6/2015 | Young |
| 9,066,626 | B2 | 6/2015 | Young |
| 11,571,091 | B2 * | 2/2023 | Charles .................. A47J 47/16 |
| 2005/0039607 | A1 | 2/2005 | Cornfield |
| 2008/0149552 | A1 | 6/2008 | Murphy |

(Continued)

*Primary Examiner* — Lee D Wilson
(74) *Attorney, Agent, or Firm* — Park, Vaughan, Fleming & Dowler LLP

(57) ABSTRACT

A cutting board with one or more cut-out sections is provided. Each cut-out is defined by a ledge, and one or more containers may be installed in a cut-out, by engaging their rims/edges with a cut-out ledge. After installation, and during use of the cutting board, no container extends above a work surface of the cutting board. Therefore, food ingredients, remnants, scraps, and so on can be easily and directly scraped or otherwise moved from the work surface to the installed containers. A portion of the cutting board that comprises the work surface is placed on a counter or other support and may be weighted to offset the weight of the containers, which overlie open space or an area lower than the counter (e.g., a sink).

15 Claims, 6 Drawing Sheets

(56) References Cited

U.S. PATENT DOCUMENTS

2009/0322004 A1   12/2009  Young
2015/0216365 A1    8/2015  Lee et al.
2020/0375408 A1* 12/2020  Charles .................. A47J 47/14
2022/0039605 A1*  2/2022  Charles .................. A47J 47/14

* cited by examiner

CUTTING BOARD WITH NESTED CONTAINERS

RELATED ART

This application claims priority to U.S. patent application Ser. No. 16/885,664 (the '664 application) in accordance with 35 U.S.C. § 120. The '664 application, which issued 7 Feb. 2023 as U.S. Pat. No. 11,571,091, was filed 28 May 2020 and claims priority under 35 U.S.C. § 119 to U.S. Provisional Application No. 62/853,394, which was filed 28 May 2019. The contents of the preceding applications are incorporated herein by reference in their entirety.

BACKGROUND

This disclosure relates to the field of consumer goods. More particularly, a cutting board is provided that features at least one cut-out for accommodating one or more containers.

Existing cutting boards often provide mediocre user experiences during food preparation due to their limited surface area, which can quickly become cluttered with prepared ingredients, scraps, containers, etc. For example, some ingredients or scraps may need to be thrown away or composted, others may need to be washed or strained, others may need to be stored, while others may be intended for immediate use. Existing cutting boards generally do not assist a user in separating, sorting, or transporting the items for their intended dispositions. Instead, a user may need to awkwardly transfer items between the board and various containers placed around the area in which the cutting board is being used.

SUMMARY

In some embodiments, a cutting board described herein features one or more cut-out sections, bores, or voids. The cutting board may be situated such that while some or most of the board is supported by a counter or other underlying support, a cut-out may be located past an edge of the support. One or more removable and nestable/stackable containers fit into a cut-out such that their outer edges substantially align with a border of the cut-out; for example, they may be configured to closely fit the border of the cut-out, which may feature a lip or ledge for engaging and supporting edges of the containers. While the cutting board is in use, items may be easily transferred from a cutting surface by brushing or scraping them into the one or more containers. Lids may be provided for some or all containers.

In some embodiments, a cutting board features a single cut-out into which multiple containers are nested or stacked, and different containers may be used for different purposes. For example, one may receive items that are to be stored, another may receive items to be composted, another acts as a strainer, and so on. In addition, when installed in the cut-out, top edges of the installed containers may be substantially coplanar with the surface of the cutting board. Because none of the containers extend above the cutting surface, there is little or no impediment to the movement of items from the working area to the containers. In particular, the items need not be lifted from the cutting board in order to be placed in a container.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a cutting board is provided that includes at least one cut-out or void for holding nestable or stackable containers. A cut-out may be fully or partially encircled by the cutting board. In these embodiments, the cutting board is placed on a counter or other support such that the cut-out is located beyond an edge of the support (e.g., over a sink, over open air). Some or all of the cutting board may be weighted so that it remains balanced and level even while food items and/or remnants are placed in the containers.

In some implementations, top edges of a container or of multiple containers installed in a cut-out are substantially flush with the top surface of a working or cutting area of the cutting board, while bottom ends of the containers extend below the bottom surface of the board. In these implementations, items on the work surface can be easily and cleanly wiped, scraped, or otherwise transferred to the container(s) with virtually no mess or spill and without lifting them from the cutting board.

Figure 1:
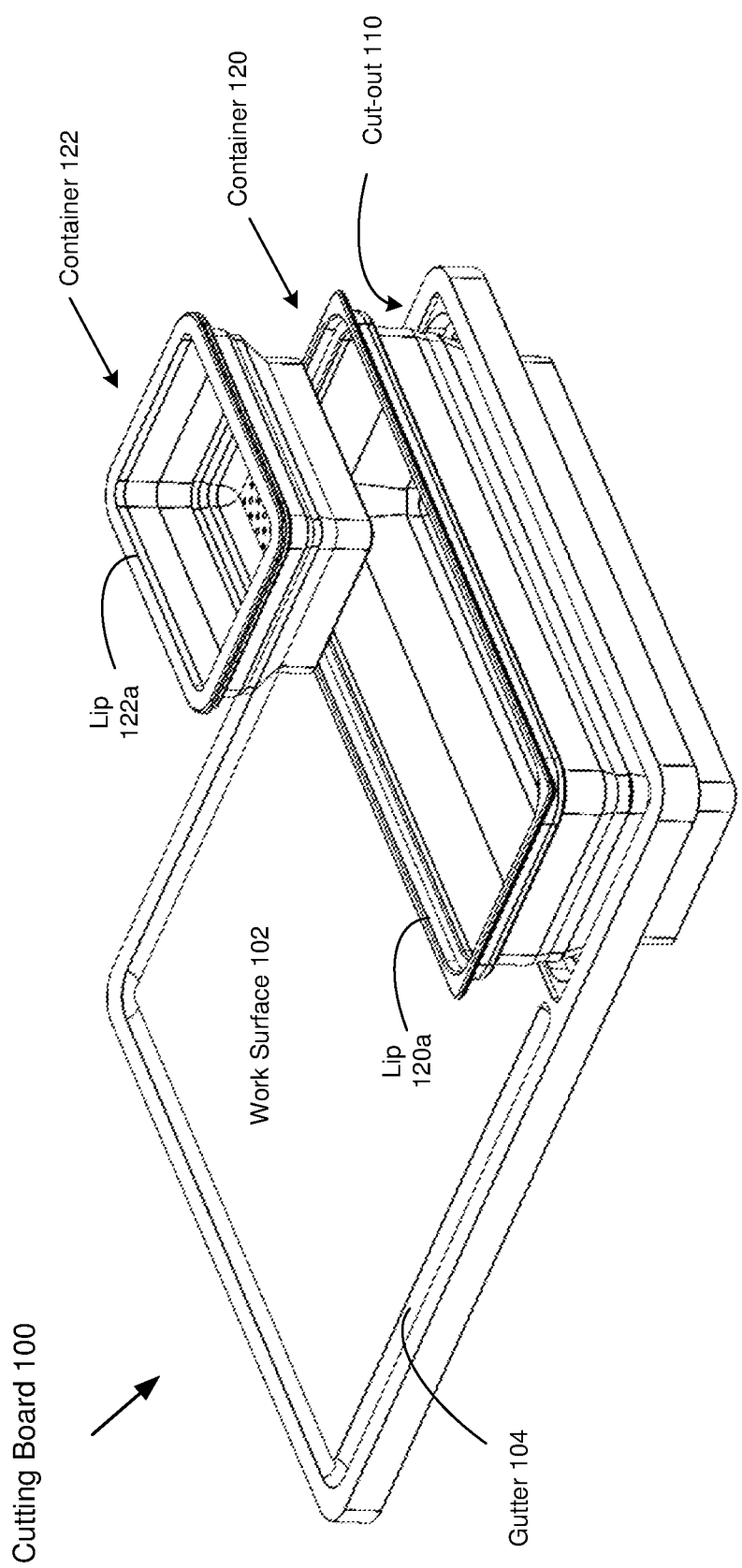
FIG. 1 is a block diagram depicting a cutting board featuring multiple nestable containers within a cut-out, in accordance with some embodiments.

FIG. 1 is a block diagram depicting a cutting board featuring multiple nestable containers within a cut-out, according to some embodiments. In these embodiments, cutting board 100 features work surface 102, gutter 104, and cut-out 110. Cutting board 100, work surface 102, and cut-out 110 may be of various suitable dimensions and composition for cutting, chopping, grating and/or otherwise manipulating or preparing food and/or other items.

In some implementations, for example, work surface 102 may be approximately 14" by 15" while cut-out 110 is approximately 5" by 15". In other implementations, work surface 102 may be weighted to reduce the ratio of work surface area to cut-out area. For example, a weighted version of work surface 110 may be approximately 12" by 12" while cut-out 110 is approximately 6" by 12". These examples are merely illustrative and do not limit the dimensions of cutting board 100 or any component(s) of cutting board 100.

Gutter 104 may define one or more edges of work surface 102 but, in at least some embodiments, does not extend between work surface 102 and cut-out 110. Although cutting board 100 is rectangular in FIG. 1, with rounded corners, in other embodiments a cutting board may be square, elliptical or have some other regular or irregular shape.

Cut-out 110 of cutting board 100 accommodates multiple removable containers, including containers 120, 122, some or all of which may be stackable or nestable. Upon installation, edges of the containers are supported on some or all sides by a ledge or edge defining the cut-out. In FIG. 1, container 120 may be considered a 'primary' container in that it is placed first within cut-out 110, while container 122 may be considered a 'secondary' container because it stacks or nests within container 120.

A primary container may accept any number of secondary containers. Therefore, if container 122 is no longer than half the length of container 120, two or more of container 122 may be nested within container 120, side-by-side. Further, one or more of container 122 may be installed as primary containers, that is, they may be installed in cut-out 110 without container 120. Yet further, one or more containers smaller than container 122 may be stacked within container 122.

A container (e.g., container 120, container 122) may feature solid walls and a solid bottom, or one or more walls and/or a bottom may be open or perforated (e.g., to allow liquid to escape). For example, if container 120 has a perforated bottom (and/or if parts of one or more walls of the container are perforated), liquid may flow or seep from the container, possibly into a sink or basin placed below cut-out 110. Also, or alternatively, if the bottom or one or more walls of container 122 are perforated, liquid may flow or seep from container 122 into container 120, thereby allowing container 122 to act as a strainer. Yet further, a separate strainer implement may be installed on a container (e.g., as a top), and the resulting assembly (i.e., the strainer and one or more containers) may remain flush with work surface 102.

In some embodiments, during use of cutting board 100 container 120 is situated in cut-out 100 without any other containers when scraps or remnants on work surface 102 are to be removed from the surface. Container 120 may be emptied as necessary to dispose of the scraps. One or more of container 122 may then be nested in container 120 in order to receive food items or ingredients that are not to be disposed of. For example, as multiple different items (e.g., onion, carrot, tomato) are manipulated (e.g., diced, chopped) on work surface 102, the prepared ingredients may be wiped or scraped into one or more containers 122.

In some embodiments, cutting board 100 (e.g., work surface 102) is made from bamboo, wood, and/or a synthetic polymer that can withstand slicing, chopping and/or other actions with sharp instruments. Containers (e.g., containers 120, 122) may be made of silicon, glass, metal, and/or a natural or synthetic polymer.

Figure 2A:
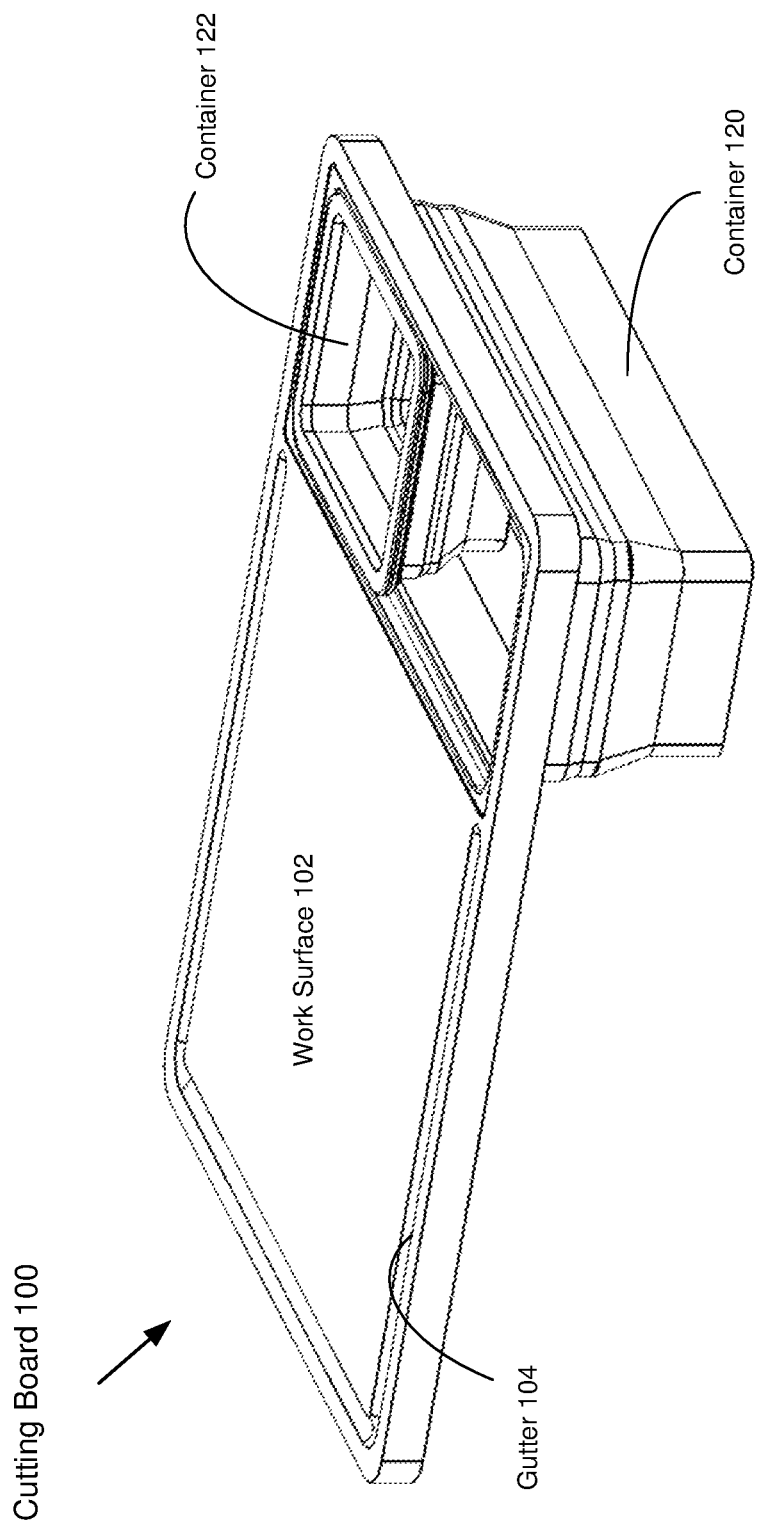
FIG. 2A is a block diagram of the cutting board of FIG. 1 with multiple nestable containers installed in a cut-out, in accordance with some embodiments.
Figure 2B:
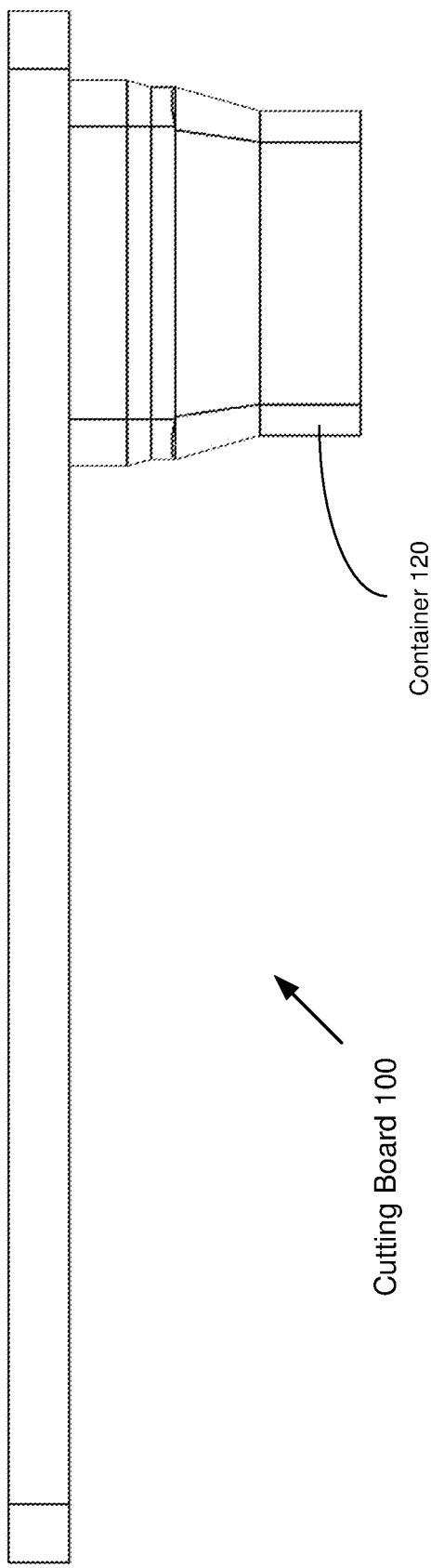
FIG. 2B is a block diagram further depicting the cutting board of FIG. 1 with multiple nestable containers installed in a cut-out, in accordance with some embodiments.

FIGS. 2A-B are block diagrams depicting cutting board 100 of FIG. 1 with nested containers installed in a cut-out, according to some embodiments. In FIG. 2A, a perspective view of cutting board 100 shows that the cut-out is populated with containers 120, 122. A lip or edge of the cut-out supports lip 120*a* of container 120 (shown in FIG. 1) along its some or all of its circumference and, likewise, lip 120*a* of container 120 supports lip 122*a* of container 122 (shown in FIG. 1).

Illustratively, container 122 may be a strainer-type container, in which case a bottom of the container is perforated or pierced in some manner so that liquid moved into container 122 (e.g., liquid that accompanies food ingredients or scraps) passes through container 122 and into container 120. If container 120 is also of the strainer type, the liquid would also pass through container 120. In some implementations, multiple (e.g., two) of container 122 may be installed in container 120, with one of them being of the strainer type and another being of a collector type that features a closed bottom and walls so that whatever is placed in the container (e.g., liquid, solid) remains in the container.

FIG. 2B is a side view of cutting board 100, showing container 120 hanging from the cutting board and supported by cut-out 110. In particular, an edge or rim of container 120 engages a ledge or lip of cut-out 110 (not visible in FIG. 2B), which prevents the container from falling or passing through the cut-out. As shown in FIG. 2B, container 120 does not extend above the work surface of cutting board 100, and neither do any containers nested within container 120 (e.g., container 122).

Figure 3:
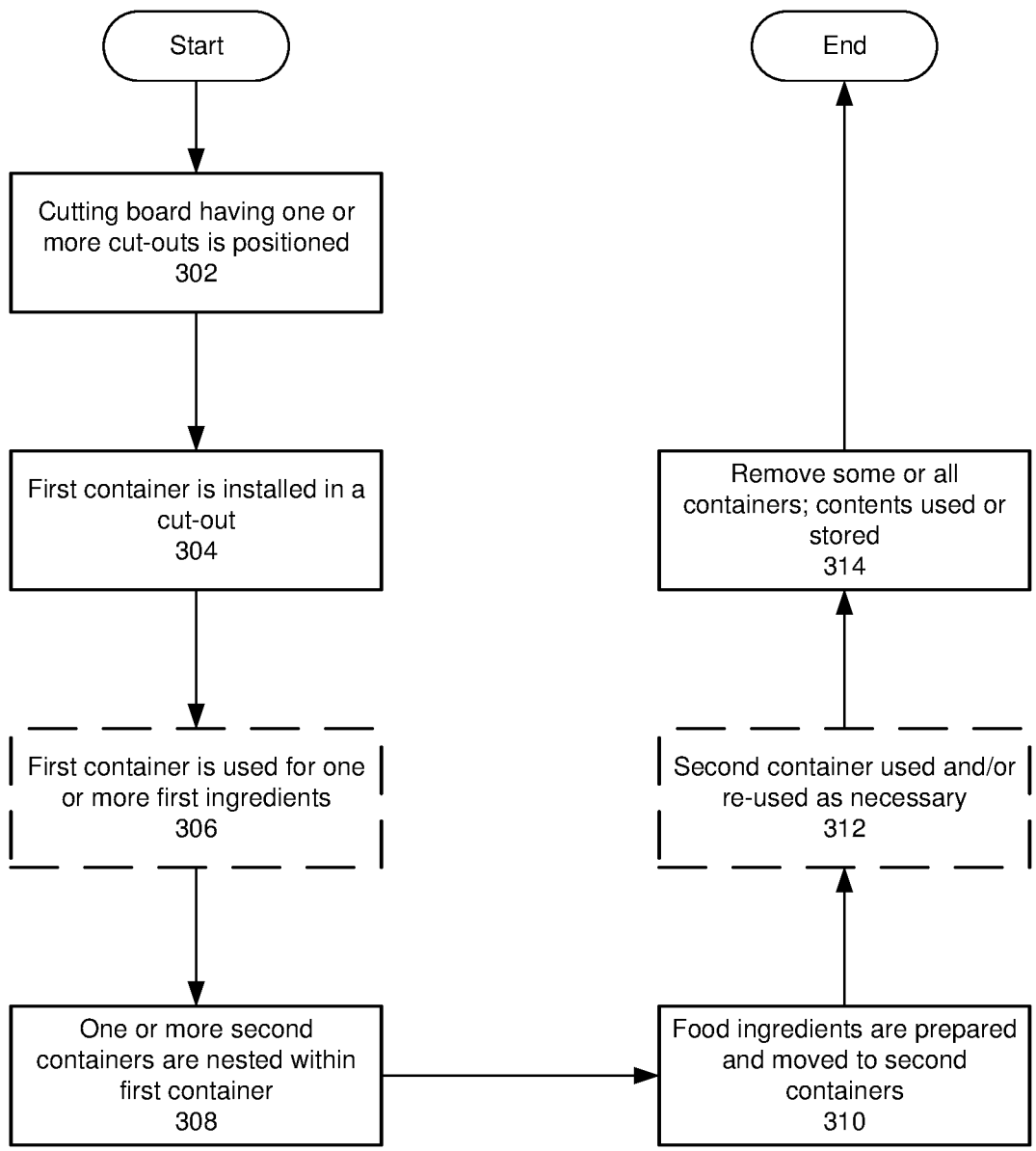
FIG. 3 is a flow chart demonstrating a method of using a cutting board having one or more nestable containers installed in a cut-out section, in accordance with some embodiments.

FIG. 3 is a flow chart demonstrating a method of using a cutting board in which nestable containers can be installed, according to some embodiments. In one or more embodiments, one or more of the steps may be omitted, repeated, and/or performed in a different order. Accordingly, the specific arrangement of steps shown in FIG. 3 should not be construed as limiting the scope of the embodiments.

In operation 302, a cutting board having one or more cut-out sections is placed on a counter or other support. Each cut-out is defined by a ledge, edge, or rim that extends around some or all of the cut-out. In some implementations, the cut-out(s) extend beyond the counter and over a sink or open air. Therefore, while a work surface of the cutting board has immediate underlying support, the cut-out(s) have no immediate underlying support.

In operation 304, a first container is installed in a cut-out section, such that an outer edge or rim of the container catches on and is supported by the cut-out, thereby preventing the first container from falling through the cut-out. The first container does not extend above the plane of the working surface of the cutting board.

The first container may be a strainer type of container (with a bottom that is perforated or otherwise pierced) or a collector type (with a solid bottom), depending on a type of food ingredient to be prepared. For example, if tomatoes are to be diced and the liquid is not needed a strainer-type container may be installed or, if an ingredient having less liquid is to be prepared (e.g., carrot, apple, potato) a collector type of container may be installed.

In optional operation 306, one or more first ingredients are prepared and the ingredients and/or scraps are scraped or wiped into the first container. The first container may then be emptied (e.g., into a cooking pan or pot, into a trash can if it only contains scraps or remnants).

In operation 308, one or more second containers are nested within the first container, such that an outer edge or rim of each second container catches on and is supported by an inner edge or rim of the first container. None of the first and second containers extend above the plane of the working surface of the cutting board.

In operation 310, additional food ingredients are prepared (e.g., cut, sliced, chopped, minced) and moved into the second containers and/or (e.g., by removing a second container) the first container. If any of the additional food ingredients require straining, one or more of the second containers may be strainer-type containers, in which case the strained liquid will pass through to the first container and, if the first container is also a strainer-type container, will also pass through the first container (e.g., and into a sink).

In optional operation 312, one or more second containers may be swapped for other, empty, second containers or may be emptied (e.g., into a cooking vessel, into the trash) and re-installed for additional use with other ingredients.

In operation 314, some or all of the first and second containers are removed from the cutting board cut-out(s). Contents of the containers may be used or placed appropriately; for example, one or more containers may be sealed with a lid to store or conserve their contents.

In some implementations, lids may be placed on the upper-most containers before, during, and/or after the containers are used. Although no container normally extends higher than the work surface of the cutting board, when a lid is placed on a container some or all of the lid may extend above the plane of the work surface.

Figure 4A:
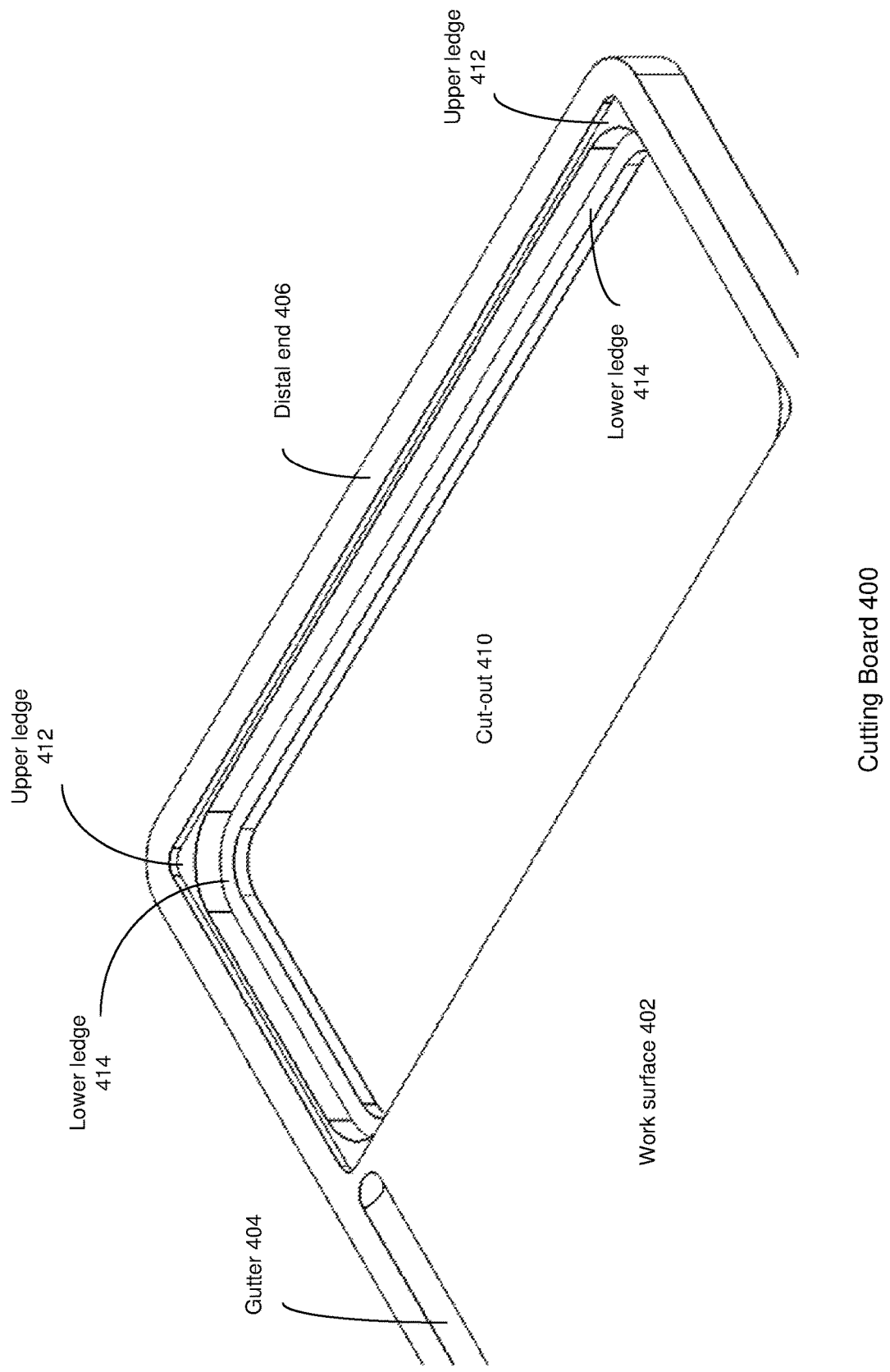
FIG. 4A is a block diagram depicting a cutting board having a cut-out section for installation of nestable containers, in accordance with some embodiments.

FIG. 4A is a block diagram depicting a cutting board having a cut-out section for installation of nestable containers, according to some embodiments.

In these embodiments, cutting board 400 includes work surface 402, gutter 404 and cut-out 410, similar to cutting board 100 of FIG. 1. FIG. 4 also illustrates distal end 406 of cutting board 400, which borders cut-out 410. Note that distal end 406 may be used as a handle for the cutting board.

Cut-out 410 is defined by walls or edges that include upper ledge 412 and lower ledge 414. In some implementations, ledges 412, 414 completely surround the cut-out, while in other implementations they do not completely surround the cut-out. Operation of ledges 412, 414 is shown in more detail in FIG. 5.

Figure 4B:
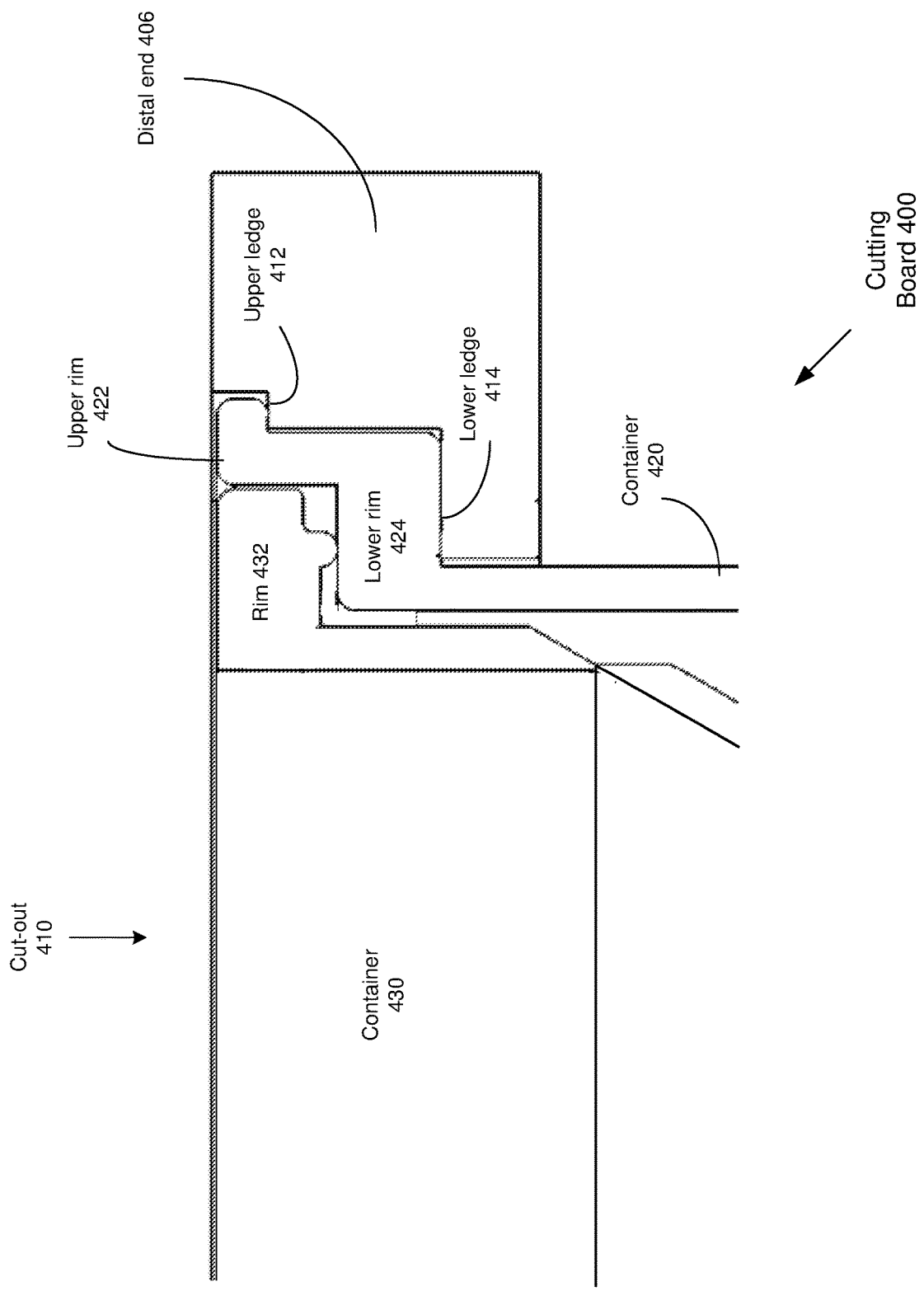
FIG. 4B is a block diagram depicting the cutting board of FIG. 4A with multiple removable and nestable containers installed therein, in accordance with some embodiments.

FIG. 4B is a block diagram depicting the cutting board of FIG. 4A with multiple removable and nestable containers installed therein, according to some embodiments. In FIG. 4B, two containers (containers 420, 430) are nested within cut-out 410. Note that neither of the containers extends above the surface of distal end 406, which is coplanar with work surface 402.

Container 420 includes upper (or external) rim or edge 422, which engages or mates with upper ledge 412, and lower (or internal) rim or edge 424, which engages or mates with lower ledge 414. Similarly, container 430 includes rim or edge 432, which engages with lower rim 424 of container 420.

In some alternative embodiments in which more than two containers are nested without a cut-out, container 430 may include upper and lower rims or edges to engage with container 420 and another container nested within container 430.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A cutting board, comprising:
a work surface upon which food is prepared; and
multiple removable containers adjoining the work surface;
wherein the multiple removable containers include a first container and, nested within the first container, at least one second container.

2. The cutting board of claim 1, wherein:
none of the multiple removable containers is higher than the work surface.

3. The cutting board of claim 1, further comprising:
a gutter.

4. The cutting board of claim 1, wherein:
the cutting board is positioned such that the work surface has underlying support but the multiple removable containers overlie open space; and
a portion of the cutting board comprising the work surface is weighted to offset weight of the multiple removable containers and contents of the multiple removable containers.

5. The cutting board of claim 1, wherein one or more of the multiple removable containers are strainer-type containers.

6. The cutting board of claim 1, wherein one or more of the multiple removable containers are collector-type containers.

7. The cutting board of claim 1, wherein:
the first container is a collector-type container; and
a first second container is a strainer-type container.

8. The cutting board of claim 1, further comprising:
at least one lid for covering one or more of the multiple removable containers.

9. The cutting board of claim 8, wherein a first lid is a strainer.

10. The cutting board of claim 1, wherein the first container comprises one or more ledges for supporting the at least one second container.

11. A method of using a cutting board, the method comprising:
positioning the cutting board so that a work surface of the cutting board is supported immediately underneath;
installing a first container proximate to the work surface, wherein the first container overlies open space;
nesting one or more second containers within the first container;
preparing food ingredients on the work surface;
moving the food ingredients into at least one of the first container and the one or more second containers; and
removing the first container and the one or more second containers.

12. The method of claim 11, wherein said moving comprises:
scraping the food ingredients directly into the first container or a second container.

13. The method of claim 11, wherein at least one of the first container and the one or more second containers is a strainer-type container.

14. The method of claim 11, wherein nesting one or more second containers within the first container comprises:
removably installing the one or more second containers within the first container such that none of the first or second containers extend above the work surface.

15. The method of claim 11, wherein nesting one or more second containers within the first container comprises:
inserting a second container within the first container such that a rim of the second container rests upon a lower rim of the first container.

* * * * *